US012235362B2

(12) United States Patent
Moebius et al.

(10) Patent No.: US 12,235,362 B2
(45) Date of Patent: *Feb. 25, 2025

(54) BEAM SCANNING METHODS FOR IMPROVED EYE SAFETY IN LiDAR SYSTEMS

(71) Applicant: The Charles Stark Draper Laboratory, Inc., Cambridge, MA (US)

(72) Inventors: Michael G. Moebius, Somerville, MA (US); Steven J. Spector, Lexington, MA (US); Steven J. Byrnes, Watertown, MA (US); Christopher Bessette, Melrose, MA (US); Scott Evan Lennox, Arlington, MA (US); Matthew A. Sinclair, Stoneham, MA (US); Francis J. Rogomentich, Wilmington, MA (US)

(73) Assignee: The Charles Stark Draper Laboratory, Inc.

( * ) Notice: Subject to any disclaimer, the term of this patent is extended or adjusted under 35 U.S.C. 154(b) by 825 days.

This patent is subject to a terminal disclaimer.

(21) Appl. No.: 16/663,814

(22) Filed: Oct. 25, 2019

(65) Prior Publication Data
US 2020/0136340 A1 Apr. 30, 2020

Related U.S. Application Data

(60) Provisional application No. 62/751,497, filed on Oct. 26, 2018, provisional application No. 62/751,500, filed on Oct. 26, 2018.

(51) Int. Cl.
*G01S 17/89* (2020.01)
*G01S 7/499* (2006.01)
(Continued)

(52) U.S. Cl.
CPC .............. *G01S 17/89* (2013.01); *G01S 7/499* (2013.01); *G01S 13/865* (2013.01);
(Continued)

(58) Field of Classification Search
None
See application file for complete search history.

(56) References Cited

U.S. PATENT DOCUMENTS

| 4,013,000 A | 3/1977 | Kogelnik |
| 5,059,008 A | 10/1991 | Flood et al. |

(Continued)

FOREIGN PATENT DOCUMENTS

| WO | WO 96/08932 A1 | 3/1996 |
| WO | WO 03/098263 A2 | 11/2003 |

(Continued)

OTHER PUBLICATIONS

Seok, et al., "Large-scale broadband digital silicon photonic switches with vertical adiabatic couplers", Optica, vol. 3, No. 1, pp. 64-70, Jan. 13, 2016.

(Continued)

*Primary Examiner* — Bernarr E Gregory

(57) ABSTRACT

A LiDAR system includes an array of optical emitters, an objective lens optically coupling each optical emitter to a respective unique portion of a field of view, an optical switching network coupled between a laser and the array of optical emitters and a controller coupled to the optical switching network and configured to cause the optical switching network to route light from the laser to a sequence of the optical emitters according to a dynamically varying temporal pattern and to vary the temporal pattern in a way that reduces risk of eye injury from the laser light.

21 Claims, 12 Drawing Sheets

(51) Int. Cl.
  *G01S 13/86* (2006.01)
  *G01S 17/26* (2020.01)
  *G01S 17/93* (2020.01)
  *H01S 3/13* (2006.01)
  *G01S 17/00* (2020.01)

(52) U.S. Cl.
  CPC ............ *G01S 13/867* (2013.01); *G01S 17/26* (2020.01); *G01S 17/93* (2013.01); *H01S 3/1305* (2013.01)

(56) References Cited

U.S. PATENT DOCUMENTS

| | | | |
|---|---|---|---|
| 5,392,157 | A | 2/1995 | Shih |
| 5,943,159 | A | 8/1999 | Zhu |
| 6,628,851 | B1 | 9/2003 | Rumpf et al. |
| 6,704,474 | B1 * | 3/2004 | Dorschner ................ G02F 1/29 385/20 |
| 6,830,944 | B1 | 12/2004 | Smits |
| 6,927,886 | B2 | 8/2005 | Plesniak et al. |
| 7,298,555 | B2 | 11/2007 | Capps |
| 7,864,419 | B2 | 1/2011 | Cossairt et al. |
| 10,466,423 | B2 | 11/2019 | Spector et al. |
| 10,473,862 | B2 | 11/2019 | Spector et al. |
| 2002/0048423 | A1 | 4/2002 | Frick et al. |
| 2002/0181836 | A1 | 12/2002 | Lemoff |
| 2003/0198259 | A1 | 10/2003 | Zhang et al. |
| 2004/0033010 | A1 | 2/2004 | McGuire, Jr. |
| 2004/0080807 | A1 | 4/2004 | Chen et al. |
| 2007/0122155 | A1 * | 5/2007 | Hillis ................ H01Q 3/2676 398/115 |
| 2009/0034042 | A1 | 2/2009 | Tholl et al. |
| 2013/0027715 | A1 | 1/2013 | Imaki et al. |
| 2015/0346340 | A1 | 12/2015 | Yaacobi et al. |
| 2016/0327751 | A1 | 11/2016 | Wu et al. |
| 2016/0335778 | A1 | 11/2016 | Smits |
| 2017/0003507 | A1 | 1/2017 | Raval et al. |
| 2017/0184450 | A1 | 6/2017 | Doylend et al. |
| 2017/0202528 | A1 | 7/2017 | Roessl et al. |
| 2018/0095165 | A1 * | 4/2018 | Cohen ................ G01S 17/894 |
| 2018/0175961 | A1 | 6/2018 | Spector et al. |
| 2019/0146087 | A1 | 5/2019 | Mansur et al. |
| 2019/0324128 | A1 | 10/2019 | Dielacher et al. |
| 2020/0132849 | A1 | 4/2020 | Moebius et al. |

FOREIGN PATENT DOCUMENTS

| | | |
|---|---|---|
| WO | WO 2008/045126 A2 | 4/2008 |
| WO | 2020087016 A1 | 4/2020 |

OTHER PUBLICATIONS

European Patent Office as the International Searching Authority, Authorized Officer: Marta Costa, International Search Report and Written Opinion of the International Searching Authority, PCT/US2019/058168, dated Jan. 3, 2020, 14 pages.

International Searching Authority Authorized Officer: Menck, Alexander, Notification of Transmittal of the International Search Report and the Written Opinion of the International Searching Authority; PCT/US2018/036538, dated Sep. 19, 2018, 15 pages.

Ashtiani, et al., "A Liquid Optical Phase Shifter With an Embedded Electrowetting Acuator," Journal of Microelectromechanical Systems, vol. 26, No. 2, 4 pages, Apr. 2017.

Chun, et al., "Spatial 3-D Infrastructure: Display-Independent Software Framework, High-Speed Rendering Electronics, and Several New Displays," appeared in Stereoscopic Displays and Virtual Reality Systems XII, Proceedings of SPIE-IS&T Electronic Imaging, SPIE vol. 5664, pp. 3002-312, 2005.

Geng, "Three-dimensional display technologies," Advances in Optics and Photonics 5, pp. 456-535, 2013.

Halle, "Holographic stereograms as discrete imaging systems," SPIE Proceeding #2176 "Practical Holography VIII," 12 pages, Feb. 1994.

Holliman, et al. "Three-Dimensional Displays: A Review and Applications Analysis," IEEE Transactions on Broadcasting, vol. 57, No. 2, pp. 362-371, Jun. 2011.

Seok, et al., "Large-scale broadband digital silicon photonic switches with vertical adiabatic couplers: supplementary material," Optica, 5 pages, Jan. 13, 2016.

Smithwick, et al., "Interactive Holographic Stereograms with Accomodation Cues," Practical Holography XXIV: Materials and Applications, SPIE, 14 pages, 2010.

Viven, et al., "Experimental demonstrations of a low-loss optical H-tree distribution using silicon-on-insulator microwaveguides," Applied Physics Letters, vol. 85, No. 5, 3 pages, Aug. 2, 2004.

International Searching Authority, European Patent Office, International Search Report and Written Opinioin, International Application No. PCT/US2017/000095, 15 pages, dated Mar. 27, 2018.

International Searching Authority, European Patent Office, Invitation to Pay Additional Fees, International Application No. PCT/US2017/066885, 13 pages, dated Mar. 19, 2018.

International Searching Authority, European Patent Office, International Search Report and Written Opinion, International Application No. PCT/US2017/066885, 19 pages, dated May 14, 2018.

International Searching Authority, European Patent Office, Invitation to Pay Additional Fees and, Where Applicable, Protest Fee, International Application No. PCT/US2018/014668, 16 pages, May 14, 2018.

International Searching Authority, European Patent Office, International Search Report and Written Opinion, International Application No. PCT/US2018/014668, 21 pages, dated Jul. 5, 2018.

International Searching Authority, European Patent Office, International Search Report and Written Opinion, International Application No. PCT/US2019/058038, 14 pages, dated Jan. 3, 2020.

USPTO Office Action dated Jun. 28, 2023 in re U.S. Appl. No. 16/664,411.

* cited by examiner

BEAM SCANNING METHODS FOR IMPROVED EYE SAFETY IN LiDAR SYSTEMS

This application claims priority from U.S. Provisional Patent Application 62/751,497, filed Oct. 26, 2018, and from U.S. Provisional Patent Application 62/751,500, also filed Oct. 26, 2018, both of which are incorporated herein by reference in their entireties.

TECHNICAL FIELD

The present invention relates to LiDAR (light detection and ranging) systems and, more particularly, to LiDAR systems that dynamically varying their temporal scanning patterns to reduce risk of eye injury.

BACKGROUND ART

Using multiple beams to scan a scene is a commonly used approach for improving frame rates in LiDAR systems. However, multiple beams increase the risk of laser exposure in the scene. LiDAR systems with the ability to selectively scan regions within a field of view present opportunities to reduce the risks of laser exposure in the scene.

SUMMARY

Embodiments of the present invention are directed to a LiDAR system with a field of view that use selective scanning to address the issue of eye safety when using a LiDAR system which emit one or more laser beams. The LiDAR system includes a laser, an array of optical emitters, an objective lens optically coupling each optical emitter of the array of optical emitters to a respective unique portion of the field of view, an optical switching network coupled between the laser and the array of optical emitters, a controller coupled to the optical switching network and configured to cause the optical switching network to route light from the laser to a sequence of optical emitters of the array of optical emitters according to a dynamically varying temporal pattern, and an optical receiver coupled to the optical switching network and configured to receive light reflected from the field of view.

In further specific embodiments, the controller may be configured to dynamically vary the temporal pattern so as to vary a repetition rate and/or the pulse width of the light from the laser illuminates a given pixel of the field of view. The controller may be configured to dynamically vary the temporal pattern so as to vary a dwell time of the light from the laser for a given pixel of the field of view and/or to vary a revisit rate at which the light from the laser illuminates a given pixel of the field of view. The dwell time and revisit rate of the light from the laser for a given pixel of the field of view may be varied such that the dwell time and revisit rate are varied in inverse proportions to maintain a constant reliability and accuracy, in which case, the controller may be further configured to analyze consecutive return pulses of the light reflected from the field of view together.

The controller may be configured to dynamically vary amplitude of the light from the laser. The controller may be configured to automatically dynamically vary the temporal pattern for a portion of the field of view designated as potentially including an eye of a living being. In the latter case, the controller may be further configured to automatically detect a portion of the field of view that includes a living being and designate the portion of the field of view as potentially including an eye of a living being. For example, there may be a digital camera, and the controller may be configured to automatically analyze image date from the digital camera to automatically detect the portion of the field of view that includes the living being.

The controller may be configured to cause the optical switching network to route the light from the laser to the sequence of optical emitters of the array of optical emitters such that the field of view is scanned horizontally and/or vertically non-sequentially. The controller may be configured to cause the optical switching network to route the light from the laser to the sequence of optical emitters of the array of optical emitters such that the field of view is scanned such that a maximum of three horizontally adjacent pixels are illuminated in sequence and a maximum of three vertically adjacent pixels are illuminated in sequence, and/or according to a non-raster pattern and/or according to a pseudorandom pattern.

The controller may be configured to dynamically vary the temporal pattern at least in part according to a speed of translation, an expected density of human beings in the field of view, and/or according to a degree of reliability of range information is needed. The controller may be configured to dynamically vary the temporal pattern differently for respective different non-overlapping regions of the field of view, for example, by dynamically varying the temporal pattern differently for the respective different non-overlapping regions of the field of view based at least in part on whether the respective regions are designated as potentially including an eye of a living being.

DETAILED DESCRIPTION

Various embodiments of the present invention are directed to a LiDAR system that dynamically varies a temporal pattern for routing light from a laser through an optical switching network to a sequence of optical emitters while avoiding potential eye injury.

Figure 1:
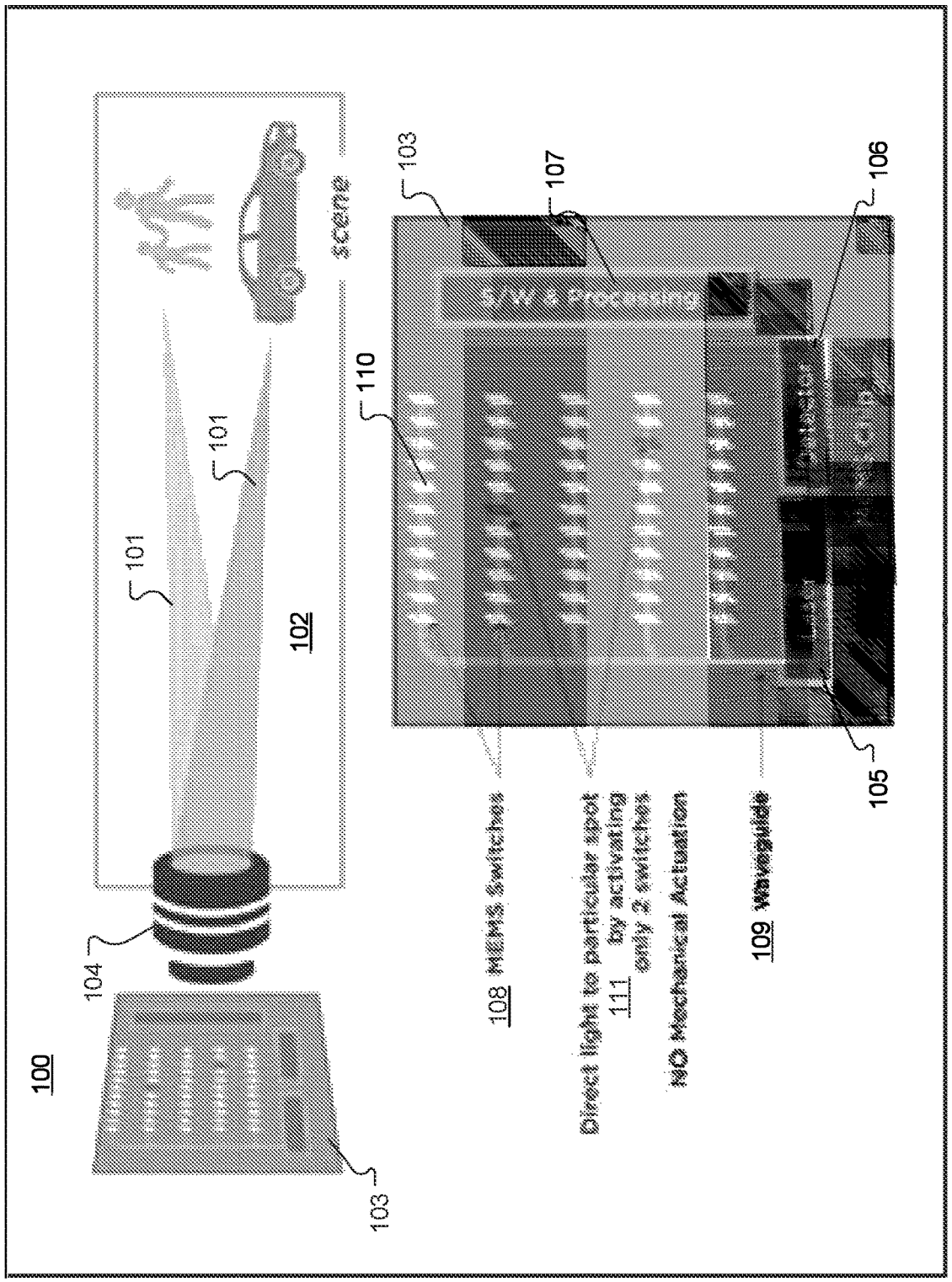
FIG. 1 shows an overview figure of a LiDAR system according to an embodiment of the present invention.

FIG. 1 shows an overview figure of a LiDAR system 100 according to one embodiment of the present invention that can be configured to emit one or more laser light beams 101 to scan a scene 102 (field of view). The optical circuit includes a photonic integrated circuit (PIC) 103, a lens 104, one or more laser(s) 105, one or more detector(s) 106 and control electronics 107. Light from the laser 105 is coupled into the photonic integrated circuit (PIC) 103 where a series of two or more MEMS switches 108 defines where on the PIC 103 the laser light is emitted. The first MEMS switch 108 may include a MEMS switchable overpass waveguide 109 that couples light from a bus waveguide to a row of optical grating switches 110. An alternative design can be configured by connecting each row of optical grating switches 110 to its own laser 105 and detector 106. In each grating switch, a MEMS device moves an optical grating 111 in proximity to the waveguide 109 to couple light out into free space. The objective lens 104 then directs the light to a specific point in the scene 102 based on where on the PIC 103 the light is emitted from. Reflected light from the scene 102 is collected by the objective lens 104 and coupled back onto the PIC 103. The signal is then coupled from the PIC 103 into the detector 106. Each grating switch 111 thus forms an optical emitter and collectively the grating switches 111 form an array of optical emitters. Each optical emitter also receives reflected light. Each optical emitter can be considered to represent one pixel of the field of view of the LiDAR system. The PIC 103 and other aspects of the LiDAR system 100 are described in U.S. Pat. Publ. No. 2018/0175961 and U.S. Patent Publication 2018/0356597; and in U.S. Provisional Patent Application 62/751,500, filed Oct. 26, 2018; the entire contents of each of which are hereby incorporated by reference herein, for all purposes.

Figure 2:
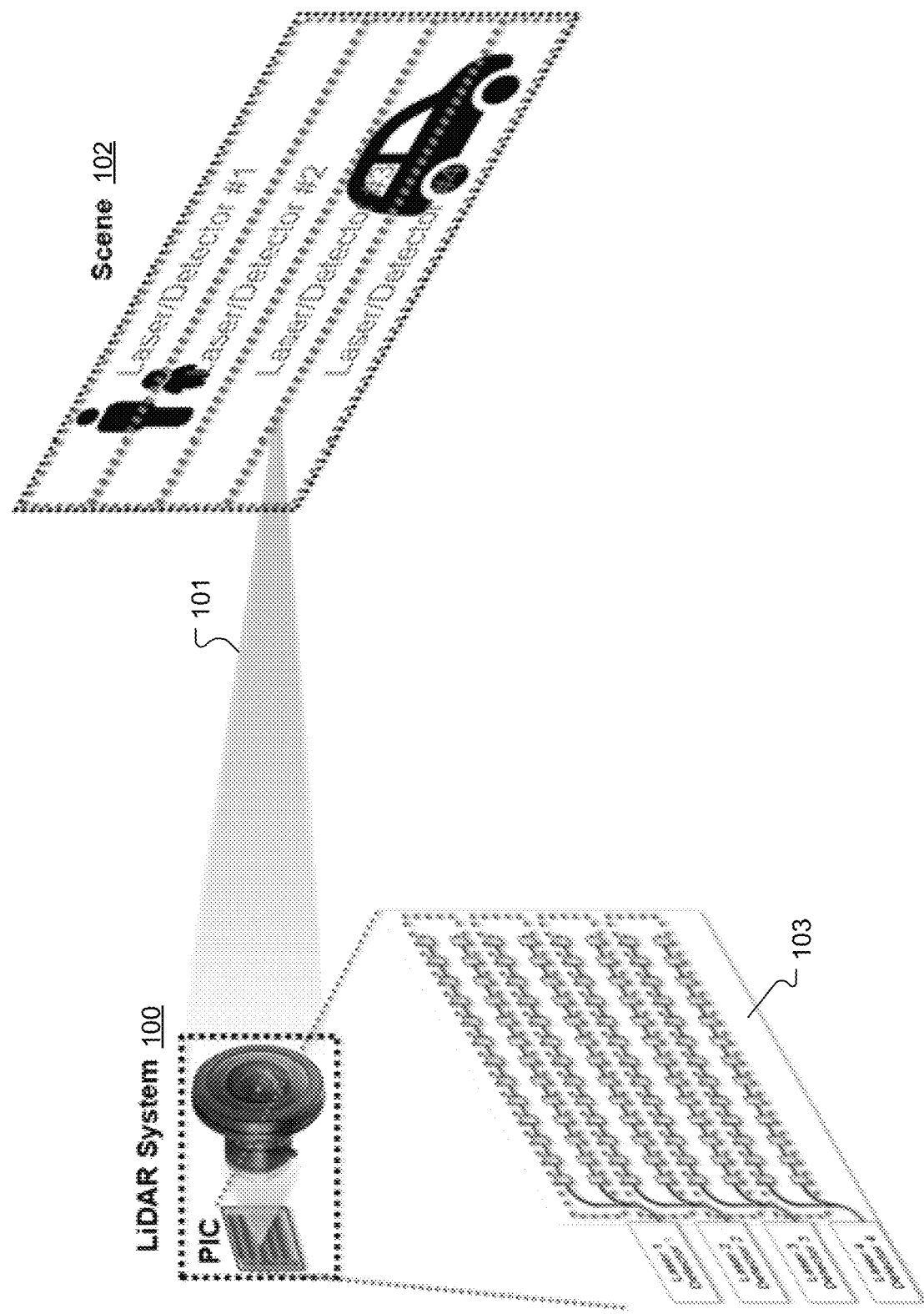
FIG. 2 shows a schematic of one embodiment of a LiDAR system with multiple lasers and detectors coupled to a single PIC and lens where each laser/detector addresses a portion of the scene.
Figure 3B:
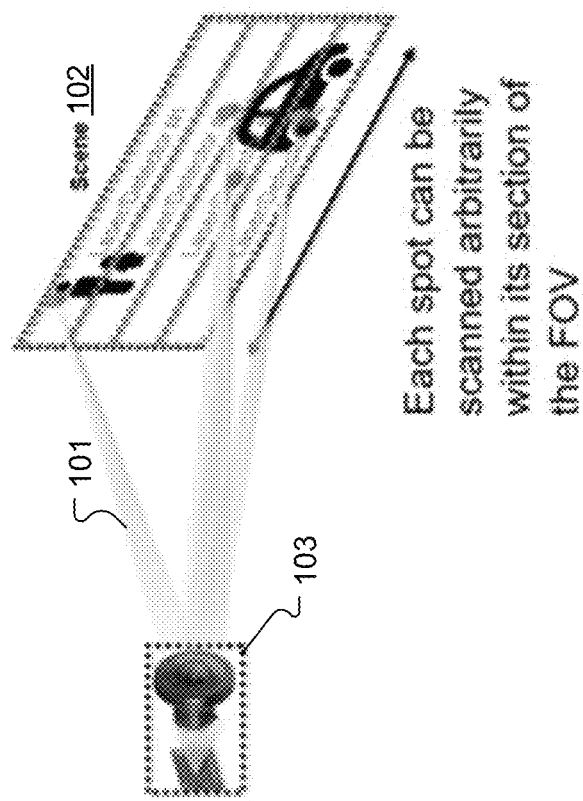
FIGS. 3A and 3B provide a comparison of how a LiDAR system architecture according to an embodiment of the present invention gives more flexibility in terms of beam scanning across the full field of view than does the prior art.
Figure 3A:
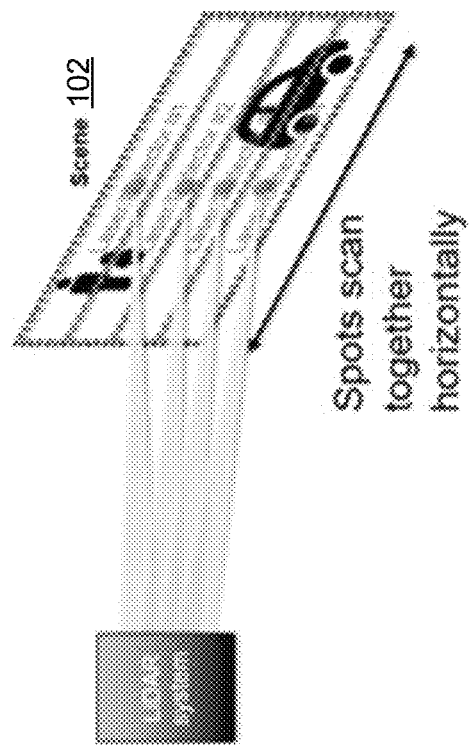

As shown in FIG. 1, only two MEMS switches 108 are required to be ON to select an emission location from any of the grating locations on the PIC 103. This means that at any point in time, a beam 101 can be sent to any arbitrary location (pixel) within the LiDAR system's field of view (FOV) 102. If the LiDAR system 100 has multiple detectors 106 and multiple lasers 105, each detector and laser can address one portion (subset) of the PIC 103 and enable scanning of a portion (subset) of the FOV 102 as shown in FIG. 2. Each laser 105/detector 106 is associated with its own set of MEMS switches 108 which can be configured to independently scan arbitrary points within the FOV 102. This is in contrast to other LiDAR systems which are configured with a column of lasers and detectors on a mechanically actuated chassis, which mechanically sweep out the full FOV together. In these other prior art systems, individual lasers cannot be selectively scanned across a different horizontal position from other beams. FIGS. 3A and 3B show a comparison of how the LiDAR system architecture of embodiments of the present invention as depicted in FIG. 3B gives more flexibility in terms of beam scanning across the full field of view than with the prior art as depicted in FIG. 3A.

Operation of embodiments of the present invention involves anticipating situations where laser eye safety is important, and then modifying the system operation for such situations.

Parameters that can be Adjusted to Affect Laser Eye Safety.

Frequency (or more generally, temporal pattern) of the laser pulses. In general, less frequent laser pulses improve laser eye safety.

Energy of each laser pulse. Lower-energy pulses are good for eye safety, at the expense of signal-to-noise ratio.

The tradeoff between dwell time and revisit rate of a pixel. Dwell time is how long the beam interrogates a pixel before moving on to another pixel, while revisit rate is how frequently the pixel is measured. During a single dwell time, a pixel may be illuminated by a series of laser pulses. To a certain extent, these can be traded off each other by simultaneously decreasing dwell time and increasing revisit rate, and measurement reliability and accuracy can be maintained, particularly if raw data from consecutive measurements (pulses) are analyzed together. In situations where laser eye safety is a factor, system operation can be shifted towards lower dwell time and higher revisit rate for each pixel. This is safer for several reasons, including the exposure duration impact on safety requirements (particularly relevant below about 1500 nm based on ANSI_Z136.1 standard) and the effects of possible motion of the LiDAR unit, relative to the person (relevant at any wavelength).

Dwell time and revisit rate individually. More simply, laser eye safety can be increased at the expense of information (signal-to-noise ratio) simply by measuring a pixel less frequently, or for less time.

Order that pixels are interrogated. It is better for laser eye safety if pixels within any given relatively small portion of the FOV (representing beams that are substantially overlapping, see below) are not interrogated simultaneously or in quick succession, due to the impact of simultaneous or cumulative (over a relatively short period of time) (cumulative exposure simultaneously from multiple beams or in rapid successions from each of the multiple beams) exposure duration (especially relevant below about 1500 nm) and of motion (relevant at any wavelength).

Data/Considerations for when Laser Safety is Particularly Important.

Measured positions of objects in the scene—in particular, measuring where people are, and from that also where their eyes are. These positions can be inferred either from the LiDAR data itself, or from other sensors such as automobile digital cameras. This information may be interpreted in conjunction with models of the beams emitted by the LiDAR unit, how they overlap, diverge or converge as a function of distance and angle.

Car speed. At high speeds, such as on a highway, reliable long-range information becomes more important, while motion blur makes eye-unsafe laser exposures relatively less likely. Conversely, at low speeds, laser safety considerations are generally relatively more important.

Environment. For example, in an urban environment, there tends to be a higher density of people, and therefore laser eye safety should be given relatively more weight, other things equal.

Figure 4:
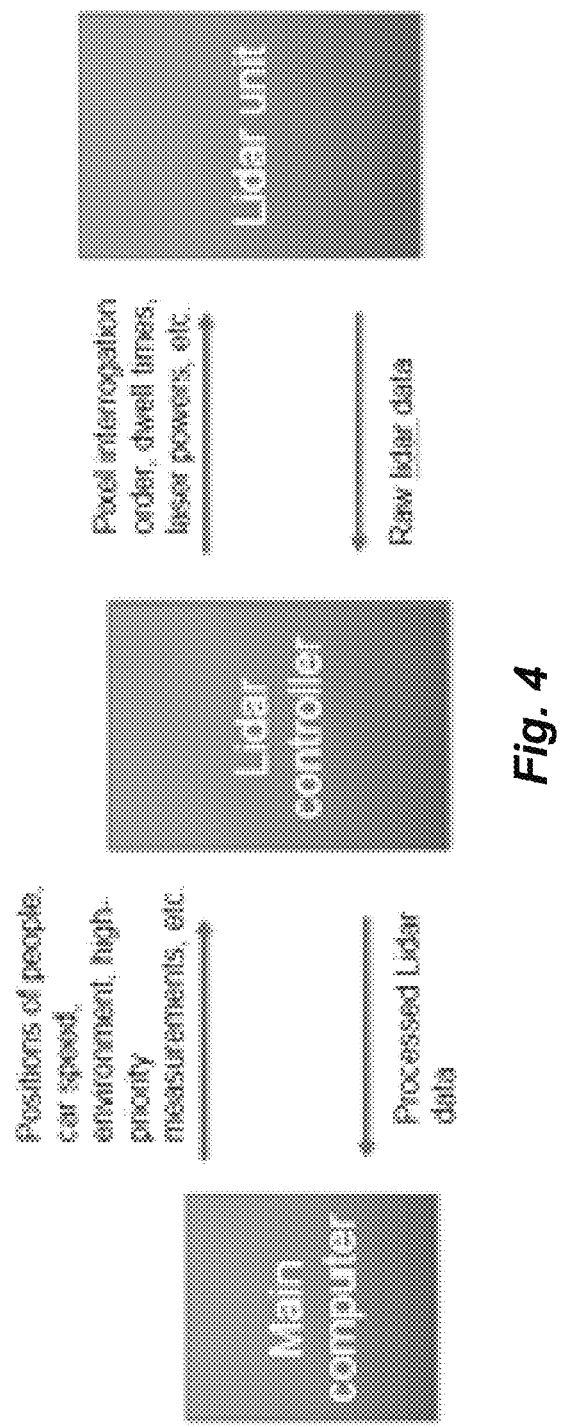
FIG. 4 is a schematic showing how information is used to determine LiDAR system operating parameters in order to maintain overall system performance while also providing laser safety.

Nature of required information. Since there are tradeoffs between laser eye safety and LiDAR data reliability, eye safety can be preferred at certain times and in certain parts of the field of view when reliable LiDAR information is less likely to be important. FIG. 4 is a schematic showing how information is used to determine LiDAR system operating parameters in order to maintain overall system performance, while also ensuring laser safety, much of is spelled out in more detail in the following sections.

Eye Safety Issue Resulting from Multiple Beams

Figure 5:
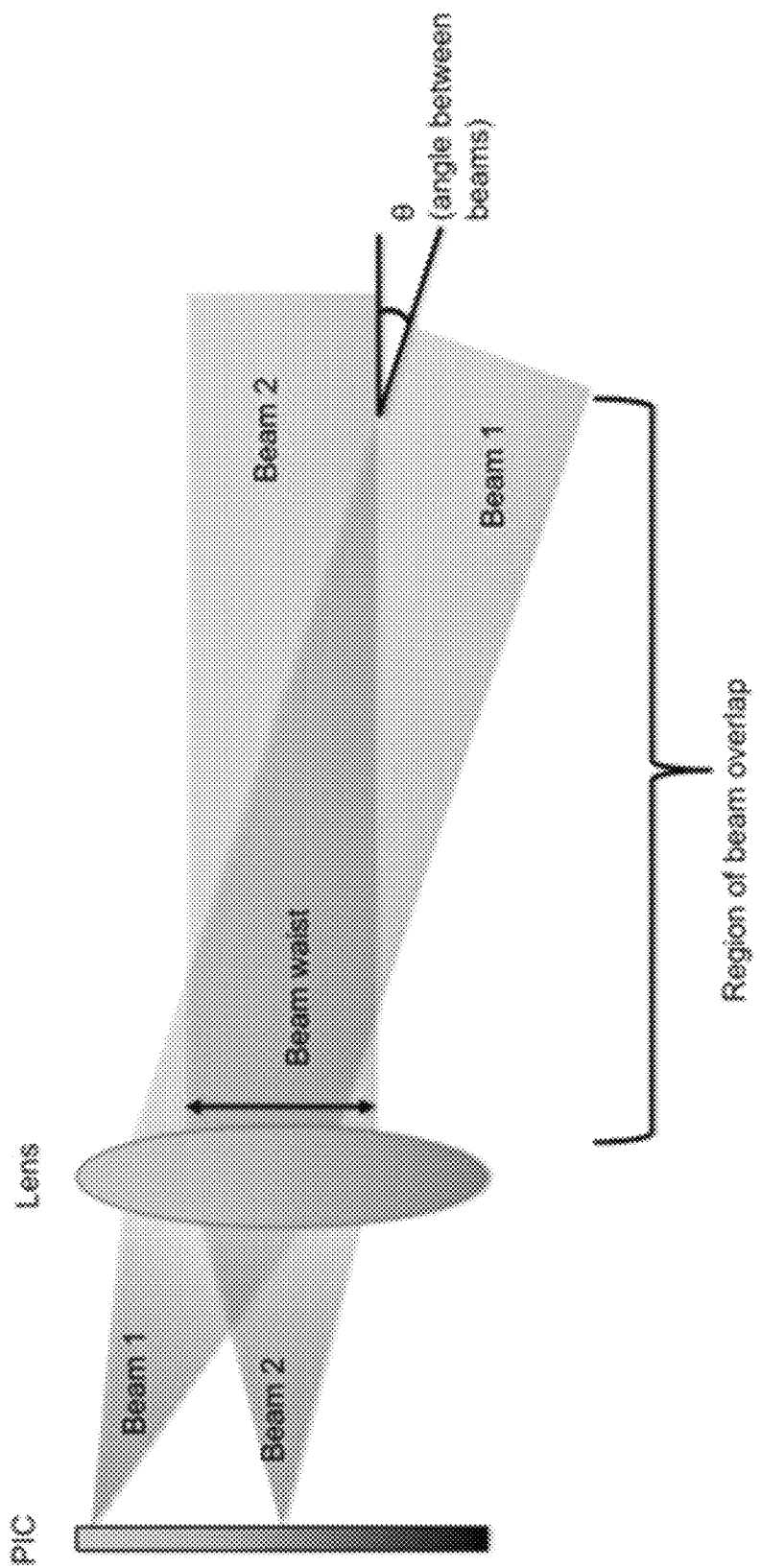
FIG. 5 illustrates beam overlap at the objective lens of LiDAR system.

A multi-beam LiDAR system such as the one shown in FIG. 1 can utilize the same objective lens for all beams emitted by the same PIC. As a result, at the exit pupil of the objective lens, multiple beams will overlap as shown in FIG. 5. Within the region of beam overlap, safe emission powers for the laser beams from the LiDAR system will be defined by the total power in all the overlapping beams. This limits the power that can be supplied by each laser in the LiDAR system.

As shown in FIG. 5, the distance from the LiDAR system over which two given beams overlap is defined by the beam waist at the objective, the angle between the two beams, and the maximum amount of overlap between the beams. Further from the LiDAR system, the power density drops as beams aimed at different points within the scene diverge from one another.

Using the same objective lens for multiple beams has several advantages. For example, it enables keeping the entire LiDAR system small while maximizing the size of the objective lens. A large objective lens is useful to collect sufficiently large signals from distant points in the scene in order to get accurate range measurements. Using a separate objective lens for each beam emitted by the system is a work-around to limit the maximum laser power, but this either leads to a LiDAR system that is large, or limits the maximum objective lens size.

Selective Scanning Designed to Minimize Beam Overlap in Scene.

Figure 6:
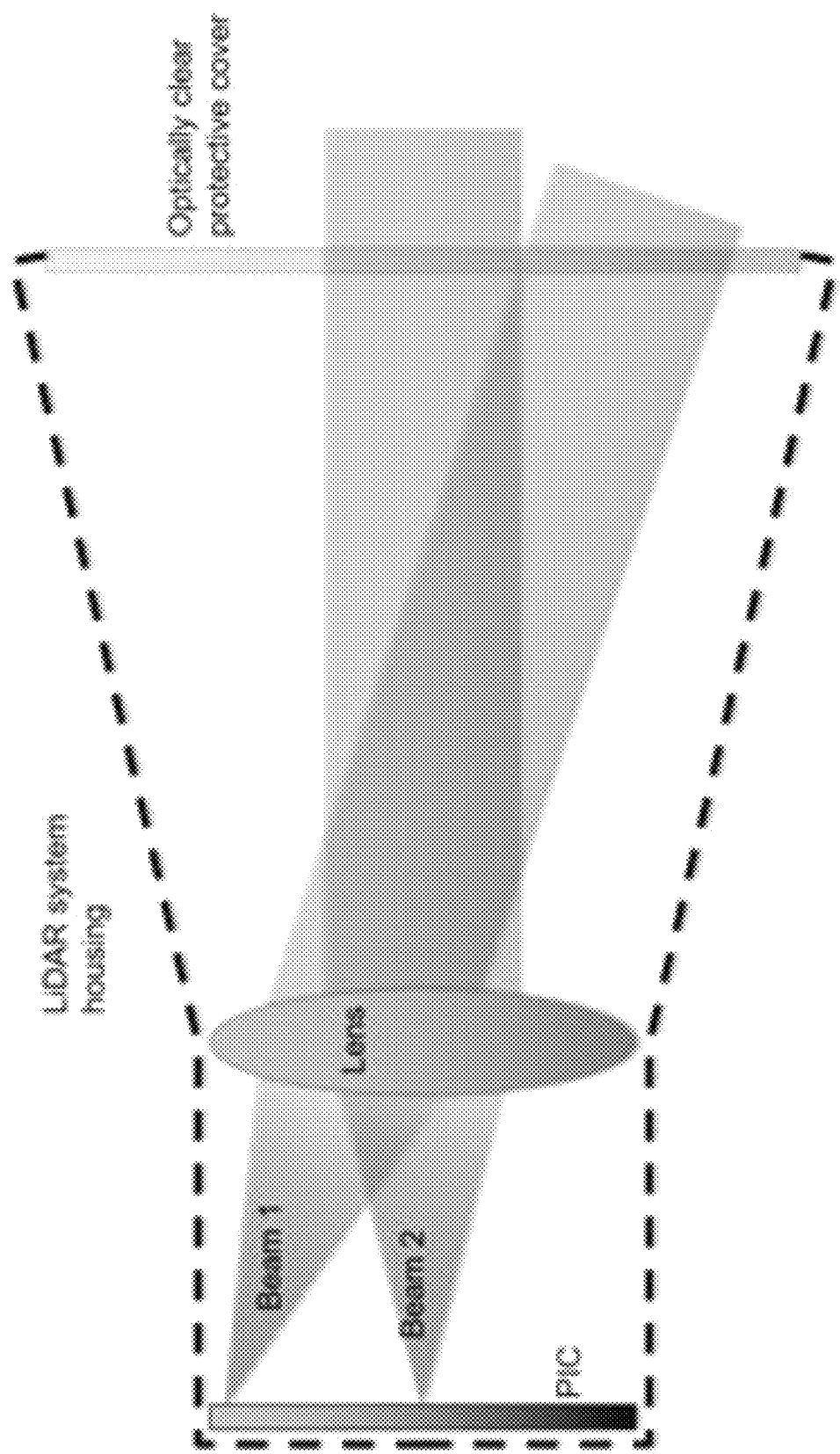
FIG. 6 is an example schematic of how the LiDAR system can be housed to avoid beam overlap in free space.
Figure 7:
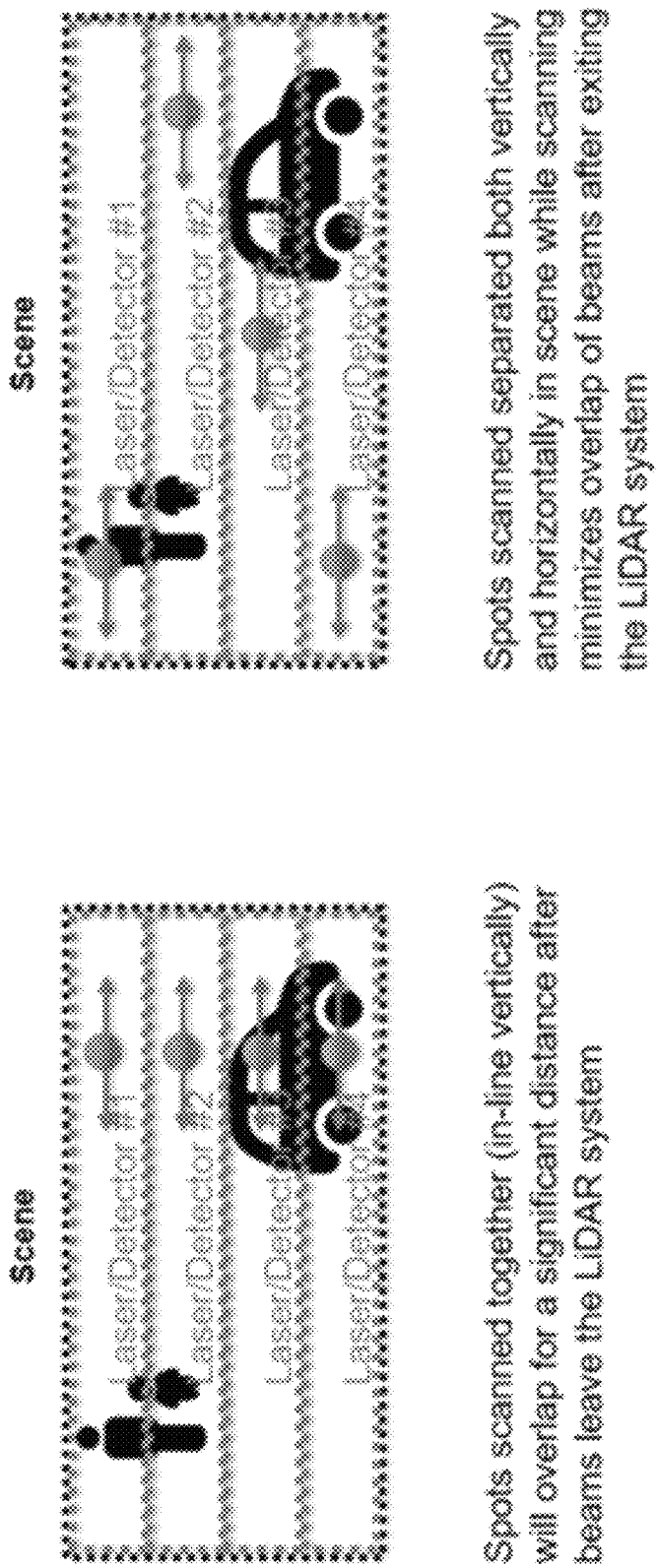
FIG. 7 shows relative beam positions while scanning with a multi-beam LiDAR system.

The ability to selectively scan each beam within its portion of the FOV enables designing the scan pattern to minimize the region of overlap between multiple beams. As shown in FIG. 7, this can be done by maximizing the angle between beams while scanning. For example, two beams 1 cm in diameter that are emitted from the same aperture with a 1-degree angle between them will overlap for approximately 57 cm after exiting the LiDAR system, whereas two beams emitted at a 5-degree angle relative to one another will overlap for only 11 cm. If beam overlap can be limited to within a physical keep-out zone in front of the LiDAR system (e.g. in the form of an optically clear protective cover after the objective lens as shown in FIG. 6), then higher beam powers can be used. Higher laser power can improve signal and enable more accurate and consistent range measurements at long range.

The beam scanning algorithm can be designed based on optical modeling of the system. Based on grating emission patterns from the PIC, ray tracing or optical propagation tools (e.g. ZEMAX® optical design software) can be used to calculate the beam size, position, and propagation direction from the objective lens. These models can then be used to design an algorithm or temporal pattern that limits beam overlap in the scene.

Figure 8A:
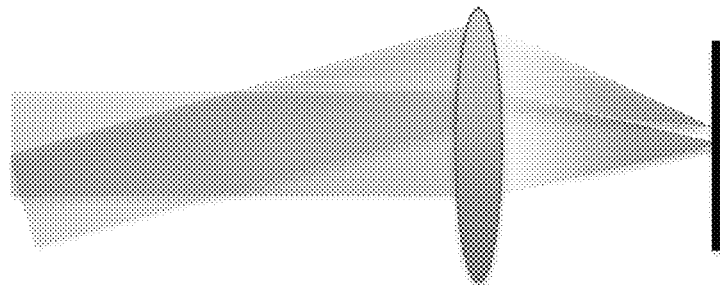
FIGS. 8A-8C show how different lens designs can lead to the beams that are exiting the LiDAR either under-filling or fully filling the exit aperture of the objective lens.
Figure 8B:
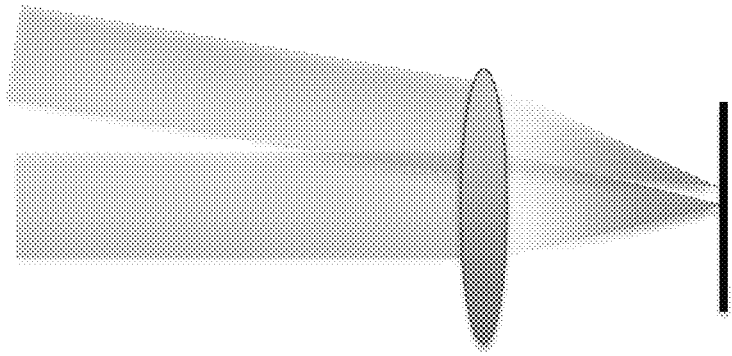
Figure 8C:
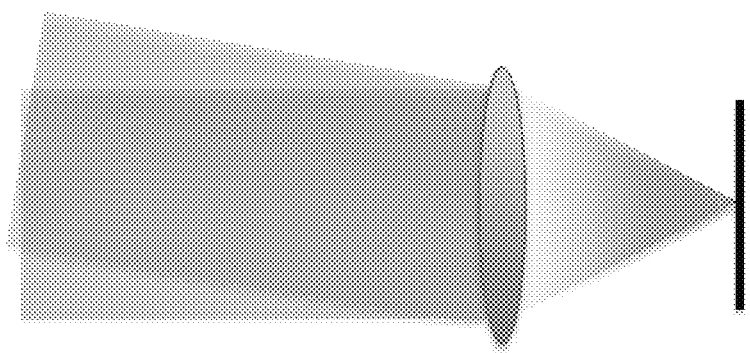
Figure 9A:
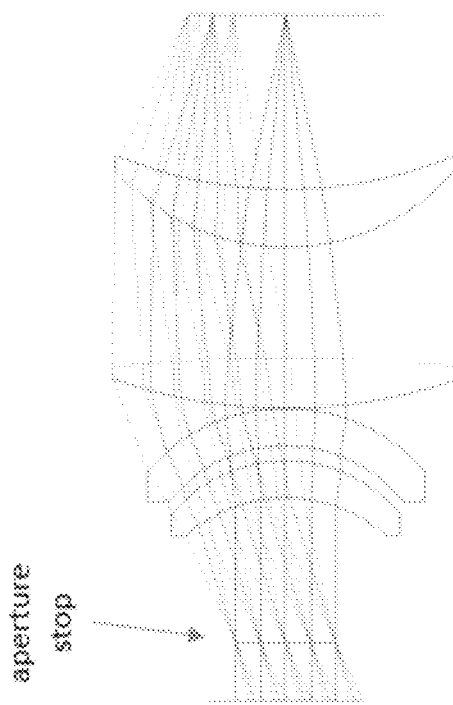
FIGS. 9A and 9B show two example ray traces from ZEMAX® optical design software simulations.
Figure 9B:
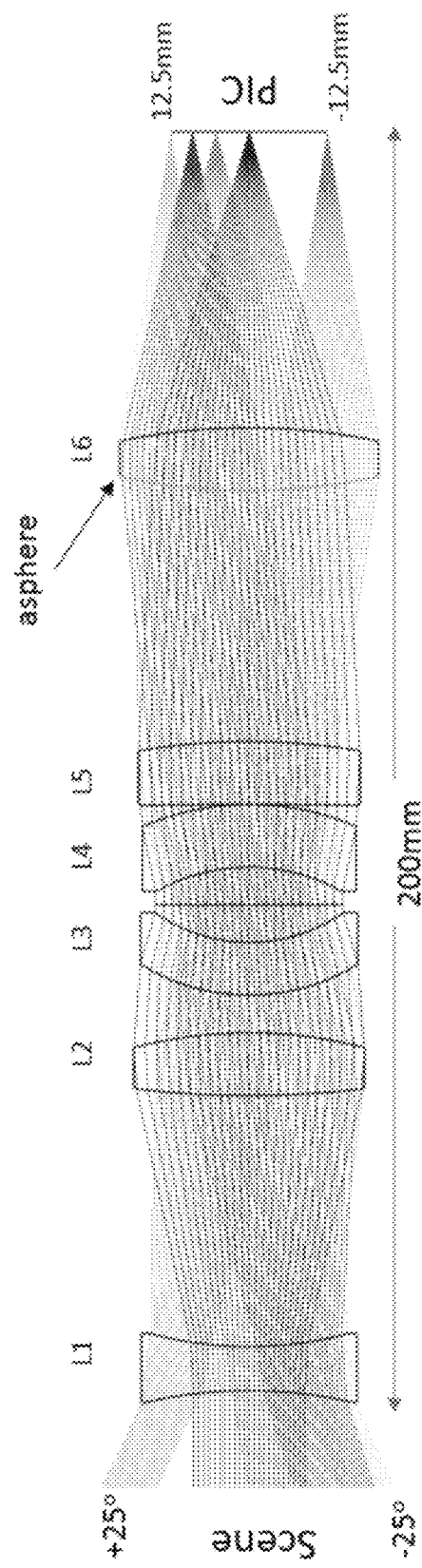

FIGS. 8A-8C show how different lens designs can lead to the beams that are exiting the LiDAR either under-filling or fully filling the exit aperture of the objective lens. FIG. 8A shows that rays at different angles do not fully fill the final optic in the objective lens; instead the rays cross in front of the objective. FIG. 8B shows that rays at different angles also do not fully fill the final optic in the objective lens; the rays diverge from one another upon exiting the objective. FIG. 8C shows rays at different angles that do fully fill the final optic in the objective lens, then the rays diverge from one another upon exiting the objective. FIGS. 8A-8C show how objective lens design can impact the amount of overlap between beams exiting the LiDAR system. The examples in FIGS. 8A and 8C would have the most severe overlap between multiple beams. The example in FIG. 8B minimizes beam overlap. In FIGS. 8A and 8B, a larger, heavier objective lens is required and the full area of the final optic in the objective lens is not used to collect signal, which limits the ability of the system to collect signal. FIGS. 9A and 9B show two example ray traces from ZEMAX® optical design software simulations.

Figure 10A:
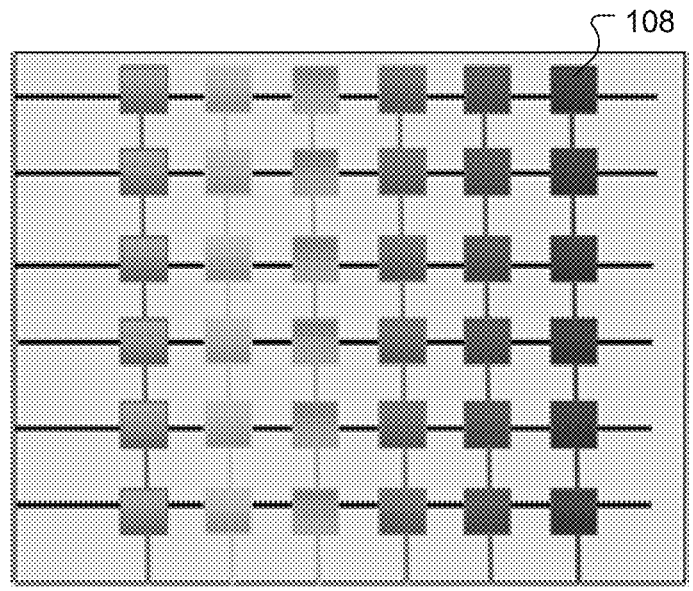
FIGS. 10A-10B show control of switches while providing good beam separation.
Figure 10B:
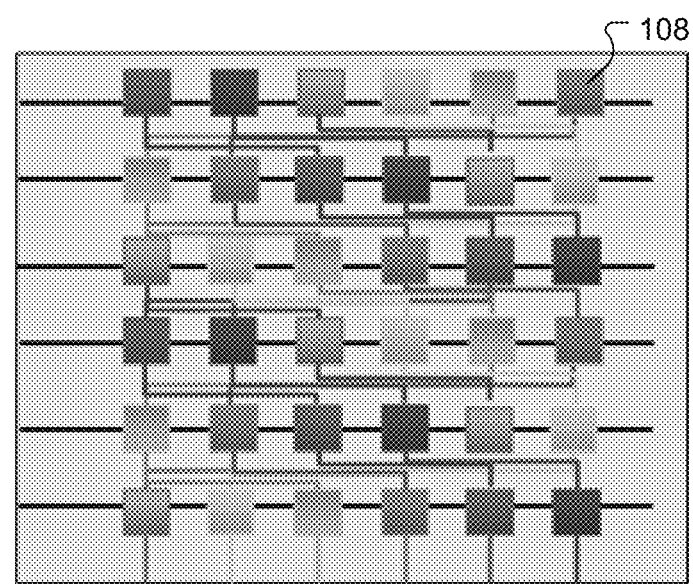

For many embodiments of the present invention, the beam is switched with random access. FIGS. 10A and 10B show a method for simple control of switches while providing good beam separation. In FIG. 10A, the simple method of connecting all vertical switches together provides poor separation of beams. But in FIG. 10B, the switches are connected in a way that separates commonly controlled switches by greater spacing. It also possible to use a predetermined pattern to obtain better separation between the beam spots. FIGS. 10A and 10B show a comparison between a vertical pattern and more random one. In this example, each switch of the same color (shade) is controlled by a single wire, and all of the beams with the same color (shade) therefore switch simultaneously. The pattern In FIG. 10A is a basic pattern where all the switches in a column are controlled simultaneously. As discussed previously, this provides poor separation between beams. The pattern In FIG. 10B has elements of the same color (shade) separated from one another in both the horizontal and vertical directions. This requires slightly more complex wiring, but provides a simple method of controlling multiple beams and obtaining greater separation than the vertical case. This is a simple example, and the principle can be expanded for larger arrays and more complicated patterns.

Interlock Laser Power and/or Dwell Time with Vehicle Speed and Object Distance to Improve Eye Safety.

Active control of the laser dwell time and laser power can also be utilized to minimize danger due to laser exposure. Adaptive scanning of individual lasers can be utilized to scan different lasers at different pixel rates within their section of the total FOV. Control of the laser power can be used to adjust the maximum laser power in the scene for different situations.

Figure 11:
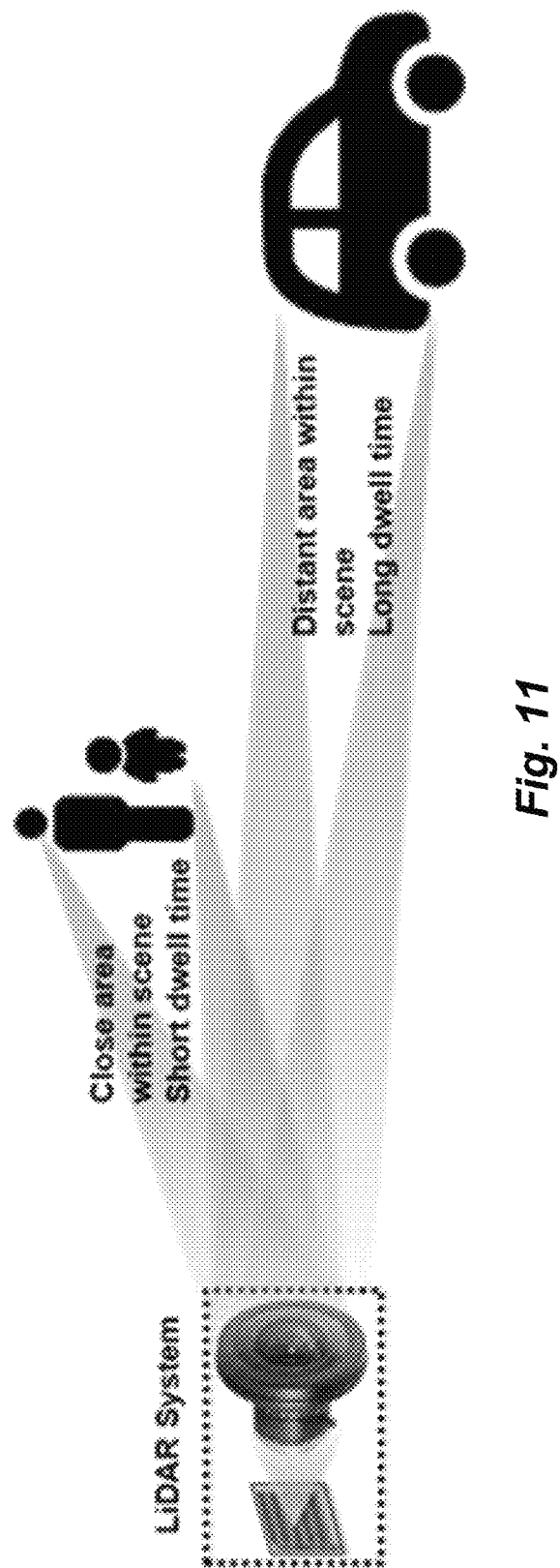
FIG. 11 is a schematic representation of using different laser dwell times for objects close to or far from the LiDAR system.

Laser dwell times can be intentionally shortened for regions of the scene that are close to the LiDAR system (FIG. 11). Objects close the LiDAR system are easier to detect and shorter laser dwell times reduce the total exposure to laser power. Particularly for LiDAR systems operating at wavelengths between about 1500-1800 nm, laser eye safety is determined primarily by average laser power, not peak laser power, making short dwell times an effective method for ensuring eye-safe laser exposure levels.

Figure 12:
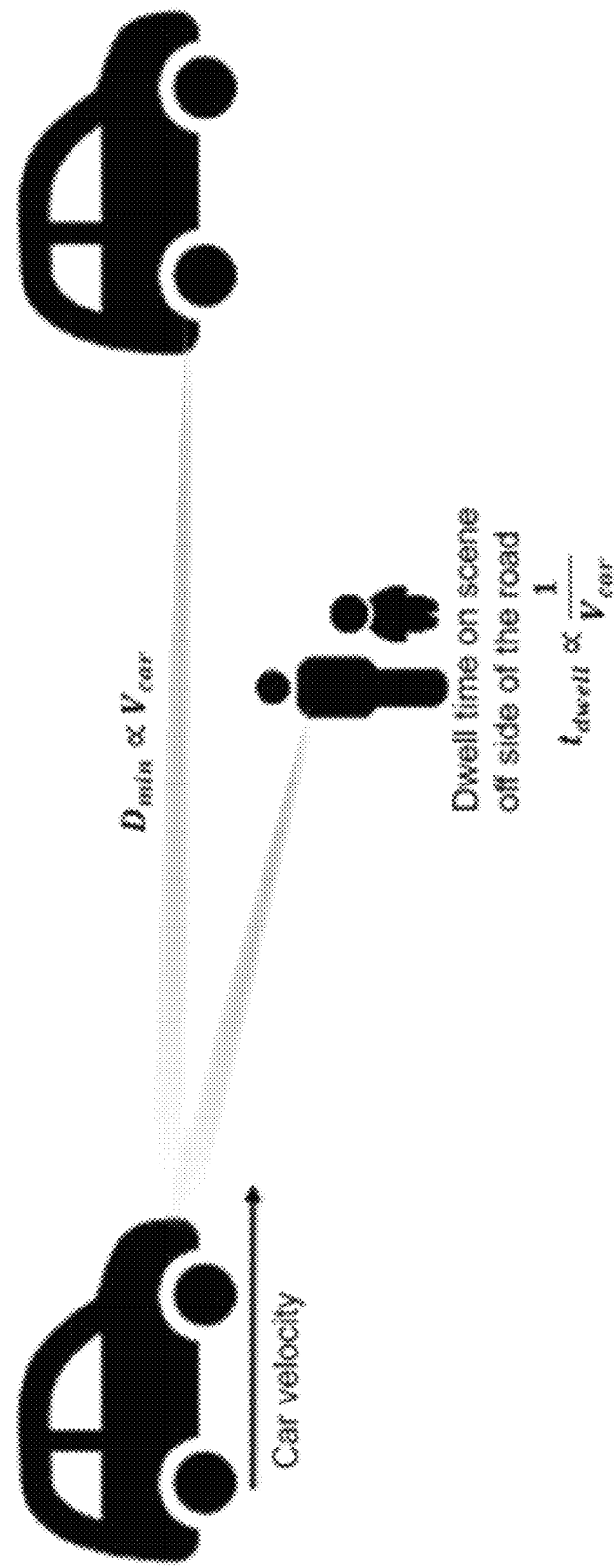
FIG. 12 is a schematic of how car velocity impacts dwell time on the scene to either side and likely minimum distance to vehicles straight ahead.

Laser power can also be adjusted for different situations. For example, laser power can be interlocked with car velocity. As car velocity increases, the total laser power emitted is increased. Several factors make higher laser power safer for eyes at higher car velocities (FIG. 12). Dwell time on objects in the scene to the side of the road is inversely proportional to the velocity of the car. As the car moves faster, the LiDAR system's maximum dwell time on objects to either side of its direction of movement is limited due to motion blur. This means that a higher average laser power can be used before the limit in "Power/Unit Area/Unit Time" defined in laser eye safety standards is exceeded (ANSI_Z136.1 standard dictates maximum permissible laser exposure "Power/cm2/10 seconds" for 1500-1800 nm wavelength). As car velocity increases, the minimum following distance to the next car increases. As a result, there is a lower chance of multiple beams from a multi-beam LiDAR system overlapping on an object directly in front of or behind the vehicle.

Interlocking the laser power with car velocity and adjusting laser dwell time based on distance to objects in the scene can be used together to ensure eye-safe laser exposure, while also ensuring that sufficient laser powers can be utilized to get reliable range measurements from the scene. These methods are relevant in both a single-beam LiDAR system, as well as a multi-beam LiDAR system.

Alternative Concepts.

There are trade-offs between eye safety and signal to noise as a function of wavelength. The LiDAR system can be equipped with a tunable laser source, rather than a single wavelength laser source. In this case, the laser emission wavelength can be adjusted depending on the required range, performance and laser eye safety limitations. For example, the ANSI_Z136.1 standard has requirements on permissible peak laser power for wavelengths <1500 nm and >1800 nm, but only limits average power for 1500-1800 nm. Certain wavelengths are safer from an eye safety or laser safety perspective and therefore a higher laser power can be used. Additionally, detectors have wavelength dependent response, which can lead to a trade-off in signal as a function of laser wavelength.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. References to a "module" are for convenience and not intended to limit its implementation. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof. A controller for adjusting a temporal pattern of a LiDAR system, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

Although various exemplary embodiments of the invention have been disclosed, it should be apparent to those skilled in the art that various changes and modifications can be made which will achieve some of the advantages of the invention without departing from the true scope of the invention.

What is claimed is:

1. A LiDAR system having a field of view, the LiDAR system comprising:
    a laser;
    an array of optical emitters;
    an objective lens optically coupling each optical emitter of the array of optical emitters to a respective unique portion of the field of view;
    an optical switching network coupled between the laser and the array of optical emitters;
    a controller coupled to the optical switching network and configured to cause the optical switching network to route light from the laser to a sequence of optical emitters of the array of optical emitters according to a dynamically varying temporal pattern; and
    an optical receiver coupled to the optical switching network and configured to receive light reflected from the field of view.

2. A LiDAR system according to claim 1, wherein the controller is configured to dynamically vary the temporal pattern so as to vary a repetition rate at which the light from the laser illuminates a given pixel of the field of view.

3. A LiDAR system according to claim 1, wherein the controller is configured to dynamically vary the temporal pattern so as to vary pulse width of the light from the laser for a given pixel of the field of view.

4. A LiDAR system according to claim 1, wherein the controller is configured to dynamically vary the temporal pattern so as to vary dwell time of the light from the laser for a given pixel of the field of view.

5. A LiDAR system according to claim 1, wherein the controller is configured to dynamically vary the temporal pattern so as to vary a revisit rate at which the light from the laser illuminates a given pixel of the field of view.

6. A LiDAR system according to claim 1, wherein the controller is configured to dynamically vary the temporal pattern so as to vary dwell time and revisit rate of the light from the laser for a given pixel of the field of view, such that the dwell time and revisit rate are varied in inverse proportions to maintain constant reliability and accuracy.

7. A LiDAR system according to claim 6, wherein the controller is further configured to analyze consecutive return pulses of the light reflected from the field of view together.

8. A LiDAR system according to claim 1, wherein the controller is configured to automatically dynamically vary the temporal pattern for a portion of the field of view designated as potentially including an eye of a living being.

9. A LiDAR system according to claim 8, wherein the controller is further configured to automatically detect a portion of the field of view that includes a living being and designate the portion of the field of view as potentially including an eye of a living being.

10. A LiDAR system according to claim 9, further comprising a digital camera, wherein the controller is configured to automatically analyze image date from the digital camera to automatically detect the portion of the field of view that includes the living being.

11. A LiDAR system according to claim 1, wherein the controller is configured to cause the optical switching network to route the light from the laser to the sequence of optical emitters of the array of optical emitters such that the field of view is scanned horizontally non-sequentially.

12. A LiDAR system according to claim 1, wherein the controller is configured to cause the optical switching network to route the light from the laser to the sequence of optical emitters of the array of optical emitters such that the field of view is scanned vertically non-sequentially.

13. A LiDAR system according to claim 1, wherein the controller is configured to cause the optical switching network to route the light from the laser to the sequence of optical emitters of the array of optical emitters such that the field of view is scanned horizontally non-sequentially and vertically non-sequentially.

14. A LiDAR system according to claim 1, wherein the controller is configured to cause the optical switching network to route the light from the laser to the sequence of optical emitters of the array of optical emitters such that the field of view is scanned such that a maximum of three horizontally adjacent pixels are illuminated in sequence and a maximum of three vertically adjacent pixels are illuminated in sequence.

15. A LiDAR system according to claim 1, wherein the controller is configured to cause the optical switching network to route the light from the laser to the sequence of optical emitters of the array of optical emitters such that the field of view is scanned according to a non-raster pattern.

16. A LiDAR system according to claim 1, wherein the controller is configured to cause the optical switching network to route the light from the laser to the sequence of optical emitters of the array of optical emitters such that the field of view is scanned according to a pseudorandom pattern.

17. A LiDAR system according to claim 1, wherein the controller is configured to dynamically vary the temporal pattern at least in part according to a speed of translation of the LiDAR system.

18. A LiDAR system according to claim 1, wherein the controller is configured to dynamically vary the temporal pattern at least in part according to an expected density of human beings in the field of view.

19. A LiDAR system according to claim 1, wherein the controller is configured to dynamically vary the temporal pattern at least in part according to a degree of reliability of range information is needed.

20. A LiDAR system according to claim 1, wherein the controller is configured to dynamically vary the temporal pattern differently for respective different non-overlapping regions of the field of view.

21. A LiDAR system according to claim 20, wherein the controller is configured to dynamically vary the temporal pattern differently for the respective different non-overlapping regions of the field of view based at least in part on whether the respective regions are designated as potentially including an eye of a living being.

* * * * *